F. S. ELLETT.
BACK PEDALING COASTER BRAKE.
APPLICATION FILED APR. 30, 1908.

908,455.

Patented Jan. 5, 1909.

WITNESSES:
C. W. Carroll
D. Gurnee

INVENTOR:
Frederick S. Ellett
by Osgood & Davis
his attorneys

UNITED STATES PATENT OFFICE.

FREDERICK S. ELLETT, OF ELMIRA, NEW YORK, ASSIGNOR TO ECLIPSE MACHINE COMPANY, OF ELMIRA, NEW YORK.

BACK-PEDALING COASTER-BRAKE.

No. 908,455.

Specification of Letters Patent.

Patented Jan. 5, 1909.

Application filed April 30, 1908. Serial No. 430,228.

*To all whom it may concern:*

Be it known that I, FREDERICK S. ELLETT, a citizen of the United States, and resident of Elmira, in the county of Chemung and State of New York, have invented certain new and useful Improvements in Back-Pedaling Coaster-Brakes, of which the following is a specification.

This invention relates to back pedaling coaster brakes for velocipedes and like vehicles, and has for its object a construction of few parts that are made cheaply and operate powerfully.

Figure 1:
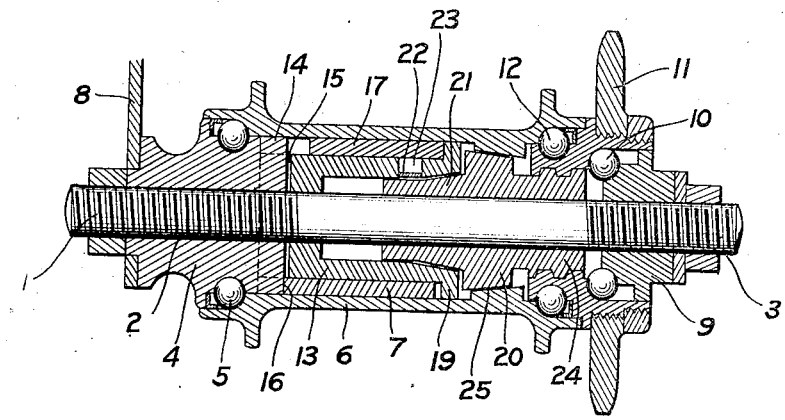
Figure 2:
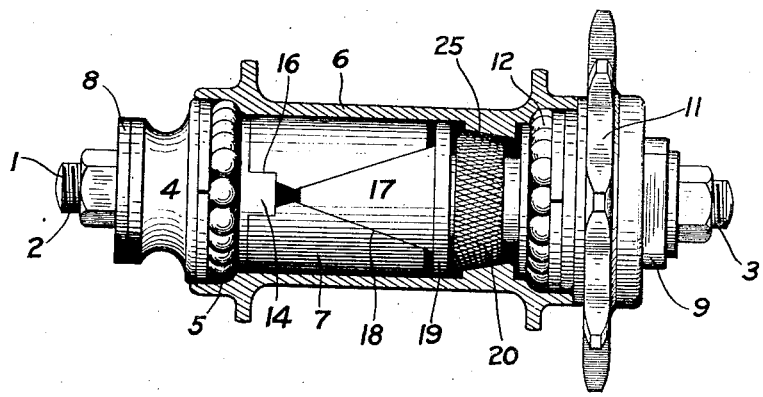
Figure 3:
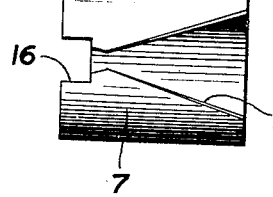
Figure 4:
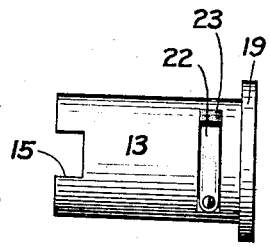
Figure 5:
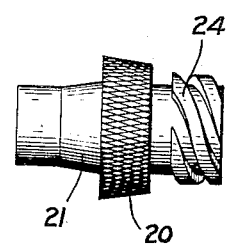

In the drawings:—Figure 1 is a central, longitudinal section of the rear hub of a bicycle equipped with the device; Fig. 2 is a side view with the hub cut away; and Figs. 3 to 5, inclusive, are side views of parts.

1 is a stationary axle adapted to be locked within the rear forks of the bicycle, and is represented as threaded at both ends 2 and 3. A block 4 is screwed upon the end 2 of the axle, which affords a ball race 5 for the hub 6, and is held stationary by the brake arm 8. On the other end of the axle 1 a block 9 affords a ball race bearing 10 for the driving sprocket 11, which in turn affords a ball race bearing 12 for that end of the hub.

The brake shell 7 is supported by a non-rotative, longitudinally movable sleeve 13. The sleeve is held against rotation by a connection with the stationary block 4 that permits it to move longitudinally. In the construction shown this is accomplished by a diametral shoulder 14 on the block 4 that enters a corresponding recess 15 in the end of said sleeve 13. The brake shell 7 is also held against rotation, and in the construction shown this is effected by a diametral slot 16 that also receives the shoulder 14 on the block 4.

The drawings show a wedge 17 for expanding the brake shell out against the hub, and this lies within a wedge shaped slot 18 in said brake shell, and is supported by the sleeve 13. This wedge is of such size that normally, when the brake shell is contracted, it extends out beyond the latter, and by engaging a flange 19 on the sleeve 13 holds the sleeve away from the stationary block, though the sleeve still engages the shoulder 14 on the stationary block. Accordingly, when the sleeve 13 is moved longitudinally inwardly upon the stationary block 4, the wedge 17 is forced further into the slot 18 in the brake shell 7, and expands the latter out against the hub.

The longitudinally movable part 20 connects the driver with the brake. This fits upon the axle, and when moved in the direction of the brake shell engages the flange 19 on the sleeve 13, forcing the latter in upon the wedge. The connector is represented as having an extension 21 that enters in between the sleeve 13 and the axle, thereby coming into contact with a retarder 22 that is carried by the sleeve 13. The retarder shown is a spring that is attached to the sleeve 13 and projects down through a transverse slot 23.

Operative connection between the driving sprocket 11 and the connector is made by means of a screw threaded sleeve 24 that is attached to the connector, and extends out to receive the sprocket. The connector is also utilized to effect driving connection between the sprocket and the hub, for that purpose engaging a friction surface 25 on the latter. On pedaling forward (assuming that the driving sprocket and hub are not already in operative connection), the connector is retarded by the slight pressure of the stationary spring 22 upon its sleeve 21, so that the sprocket 11 turns upon the threaded sleeve 24 of the connector, and brings the connector proper, 20, into frictional contact with the cone 25 on the hub. To coast, the feet are held stationary upon the pedals, when the connector will disengage the hub and move over to the brake mechanism. To operate the brake, the pedals are rotated backwardly, thereby forcing the connector in upon the sleeve 13, which in turn moves inwardly upon the shoulder 14 on the stationary block 4, at the same time forcing the wedge 17 into the brake shell and expanding the latter out against the hub.

What I claim is:—

1. The combination with a wheel hub and an anchored brake, of a driver for the hub and brake, normally disconnected from both; and a longitudinally shiftable connector, having an outwardly-projecting sleeve adapted to support the driver; and means whereby rotation of said driver upon said sleeve serves to shift said connector longitudinally to connect operatively the driver with the brake; substantially as shown and described.

2. The combination with a wheel hub and an anchored brake, of a driver for the hub and brake, normally disconnected from both; a longitudinally-shiftable connector for operatively connecting the driver with the brake, having an outwardly-projecting, screw-threaded sleeve, adapted to receive the driver; substantially as shown and described.

3. The combination with a wheel hub and an anchored brake, of a driver for the hub and brake, normally disconnected from both; a longitudinally-shiftable connector, having an outwardly-projecting sleeve adapted to support the driver; means whereby rotation of said driver upon said sleeve serves to shift said connector longitudinally to connect operatively the driver with the brake; and means for insuring the relative turning of the driver and connector; substantially as shown and described.

4. The combination with a wheel hub and an anchored brake, of a driver for the hub and brake; a longitudinally-movable connector, having an outwardly extending screw threaded sleeve adapted to receive the driver; means located at one side of said connector whereby engagement is made with the hub, and on its opposite side whereby it actuates said brake; substantially as shown and described.

5. The combination with a wheel hub and an anchored brake mechanism, including its support, of a driver for the hub and brake; a longitudinally-movable connector, having both an outwardly extending sleeve adapted to receive the driver, and an inwardly extending sleeve adapted to engage retarding means carried by the brake mechanism; and means whereby rotation of the driver upon its said sleeve serves to shift said connector longitudinally to connect operatively the driver with the brake; substantially as shown and described.

6. In a coaster brake mechanism, the combination with a rotary sprocket of a stationary brake mechanism adapted to be operated thereby, and having a transverse slot therethrough; a connector between the sprocket and brake, having a part that is concentric with the latter, and extends beneath said slot; and a retarder, fast to said brake mechanism at one end, and extending down through it to engage yieldingly said connector; substantially as shown and described.

FREDERICK S. ELLETT.

Witnesses:
D. L. WHITTIER,
A. C. RICE.